United States Patent [19]

Durand

[11] Patent Number: 5,421,772
[45] Date of Patent: Jun. 6, 1995

[54] DEVICE FOR FIXATION BETWEEN A SUPPORT AND ACTUATION MEMBER AND A TOOL

[75] Inventor: Lucien Durand, Lyas, France

[73] Assignee: Durand International, France

[21] Appl. No.: 229,310

[22] Filed: Apr. 18, 1994

[30] Foreign Application Priority Data

Apr. 19, 1993 [FR] France ................... 93 04794

[51] Int. Cl.[6] .............................................. A22B 5/20
[52] U.S. Cl. ................................................ 452/160
[58] Field of Search ................... 452/160; 33/437, 438

[56] References Cited

U.S. PATENT DOCUMENTS

| | | | |
|---|---|---|---|
| 4,383,375 | 5/1983 | Avella et al. | 33/437 |
| 4,507,822 | 4/1985 | Herubel | 452/160 |
| 4,559,715 | 12/1985 | Weglin | 33/438 |
| 4,641,435 | 2/1987 | Brown | 33/427 |
| 4,653,150 | 3/1987 | Leining | 452/160 |
| 4,763,887 | 8/1988 | Yang | 269/247 |
| 4,770,353 | 9/1988 | Steffens | 241/282.2 |
| 4,918,822 | 4/1990 | Levitt | 33/432 |

*Primary Examiner*—Willis Little
*Attorney, Agent, or Firm*—Bacon & Thomas

[57] ABSTRACT

This invention relates to a device for temporarily connecting a tool and a tool-holder, characterized in that:
  the tang comprises two convergent edges and an opening located between said edges,
  the support member comprises a mortise and presents, between its edges, a through housing,
  the removable fixation system comprises a block placed in relation with the housing and bearing a mobile lock disposed in said housing, provided with a locking head and associated with means for manual control in position of retraction and for actuation in locking position.

The invention is applicable to machines for splitting the carcasses of slaughtered animals.

16 Claims, 7 Drawing Sheets

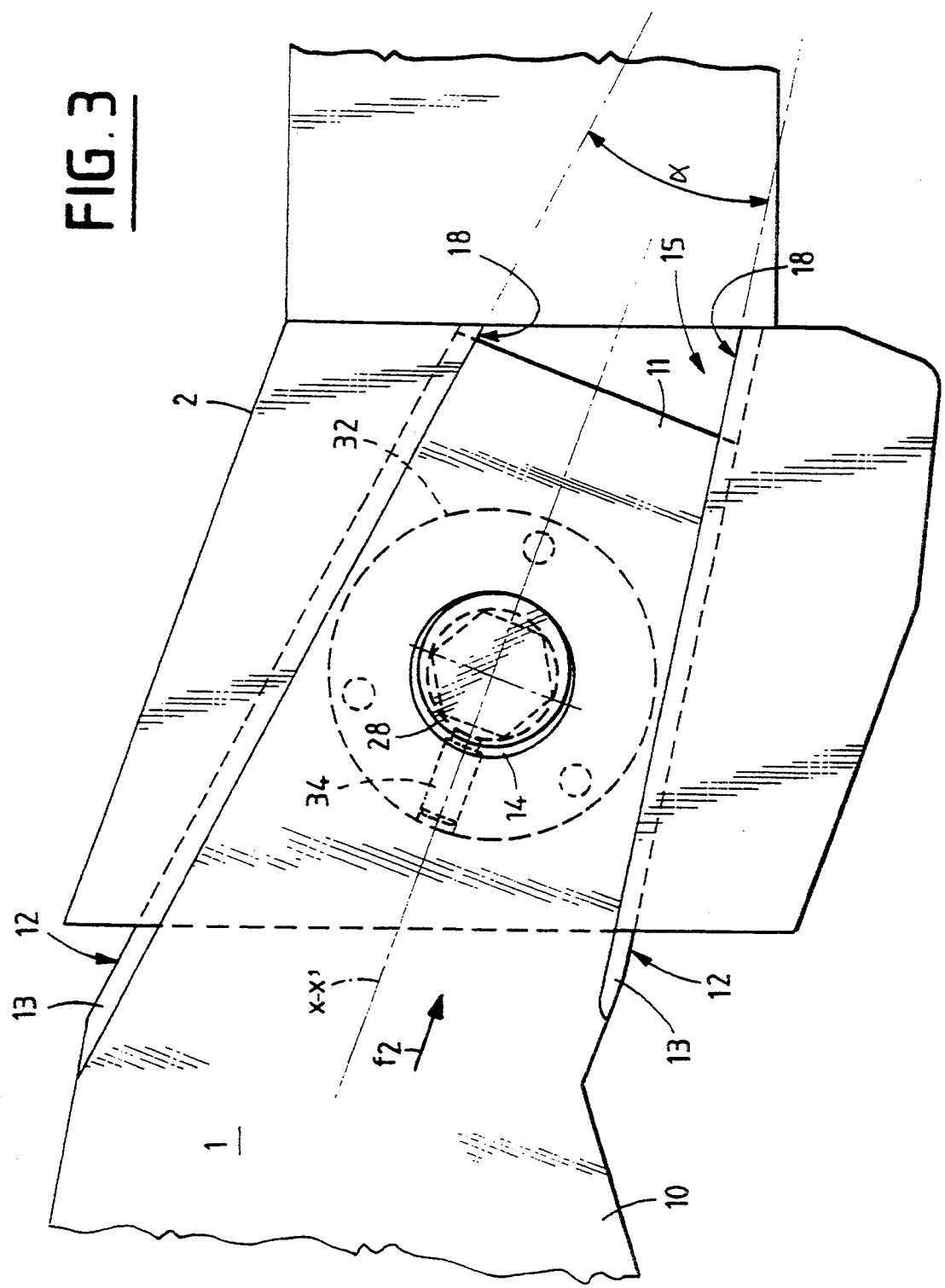

DEVICE FOR FIXATION BETWEEN A SUPPORT AND ACTUATION MEMBER AND A TOOL

FIELD OF THE INVENTION

The present invention relates to a device for removable fixation between a support and actuation member and a tool.

The technical domain of the invention is the temporary connection between a tool and a support and actuation member constituted for example by an arm animated in an appropriate movement by a drive member to render the tool active.

The technical domain concerned is more particularly, but not exclusively, the domain of tools having to be animated, in order to function, in a reciprocating displacement.

By way of preferred, non-limiting application, tools of the knife, sheet, blade or like type may be cited, which are used for example for splitting slaughtered animal carcasses.

BACKGROUND OF THE INVENTION

The tools of the above types must be periodically dismantled in order to check the integrity thereof or to restructure, by machining, sharpening or the like, the active part or parts that they comprise and which suffer either wear and tear or deteriorations due to use thereof.

To that end, it is generally recommended to employ a tenon and mortise type mode of assembly, the tenon being formed by the tang of the tool and the mortise being presented by the support and actuation member. Assembly is completed by a removable fixation system which may be a strip or the like of the type with wedging by conical surface.

Such means are not satisfactory, as they do not provide positive safety in the assembly that they ensure.

In fact, it is frequently ascertained that the operational cycles and the vibrations produce loosening and unwedging which have for effect to release the tang with respect to the mortise, at least partially. A more or less large clearance is established which results either in a deterioration of the complementary parts, or possibly in a total release leading to the untimely projection of the tool, with the risks of accident inherent thereto.

It is precisely one object of the present invention to overcome the above drawbacks by proposing a novel removable fixation device for functionally connecting a tool and a support and actuation member, establishing a particularly firm and resistant, positive assembly which may be considered as insensitive to vibrations, and even to the functional mode of the tool.

It is another object of the invention to propose a removable fixation device which is simple and rapid to position and remove, so as to allow a positive connection and an easy disconnection to promote and facilitate the operations of assembly or mounting and of dismantling of the tool with respect to the support and actuation member.

SUMMARY OF THE INVENTION

To attain the objects set forth above, the device according to the invention is characterized in that:

the tang locally comprises, on the one hand, two longitudinal edges defining a tenon and converging at an angle and, on the other hand; an opening located between said edges, the support member comprises a mortise, defined by two longitudinal edges, complementary to those of the tenon and presents, between said edges, a through housing opening in the mortize in order to be substantially in register with the opening in the state of engagement of the tenon in the mortise, the removable fixation system comprises a block placed in relation with the housing and bearing a mobile lock disposed in said housing, provided with a locking head and associated with means for manual control in position of retraction of the head with respect to the mortise and for actuation in locking position, in which the head is engaged in the tenon opening and acts on the edge thereof to urge said tenon in relative displacement in the mortise, in the direction of convergence of the edges.

BRIEF DESCRIPTION OF THE DRAWINGS

The invention will be more readily understood on reading the following description with reference to the accompanying drawings, in which:

FIG. 3 is a partial elevation taken along line III—III of FIG. 2.

DESCRIPTION OF PREFERRED EMBODIMENTS

Figure 1:
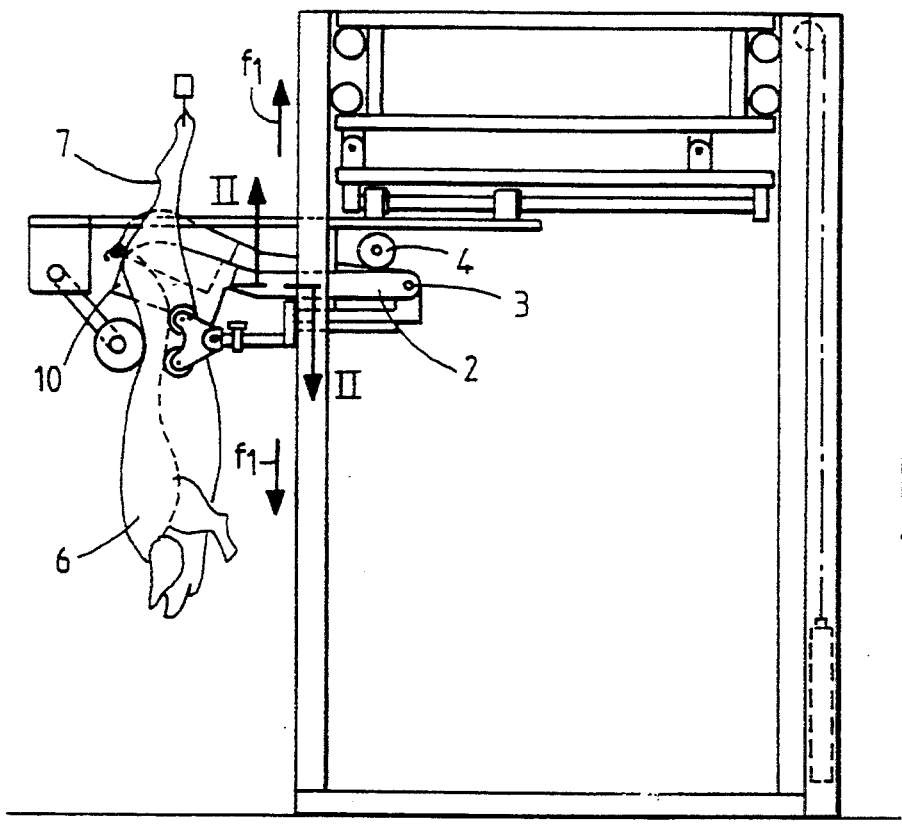
FIG. 1 is a schematic elevation illustrating an example of application employing the removable fixation device according to the invention.

Referring now to the drawings, FIG. 1 schematically shows an example of application of the device of the invention intended temporarily to connect a tool 1 and a support and actuation member 2 capable of being animated by a reciprocating displacement in the double direction of arrow $f_1$, being, for example, mounted on a pivot 3 and connected to a drive member 4, such as an eccentric or the like.

In the example of application, the member 2 is constituted by an arm and the tool 1 by a knife, sheet or blade intended to split the carcass 6 of a slaughtered animal suspended, as is known in the art, by its rear legs 7, from a circulation track 8.

It is clear that the above example is given only by way of illustration, as the removable fixation device according to the invention may be employed wherever the temporary removable fixation of a tool with respect to a support member is to be ensured.

Figure 4:
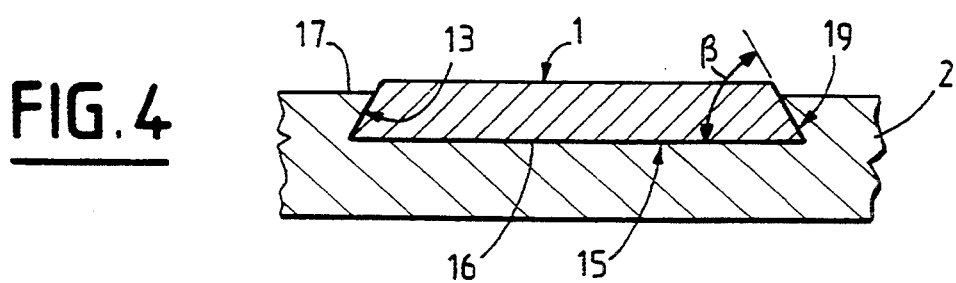
FIG. 4 is a partial transverse section taken along line IV—IV of FIG. 3.
Figure 5:
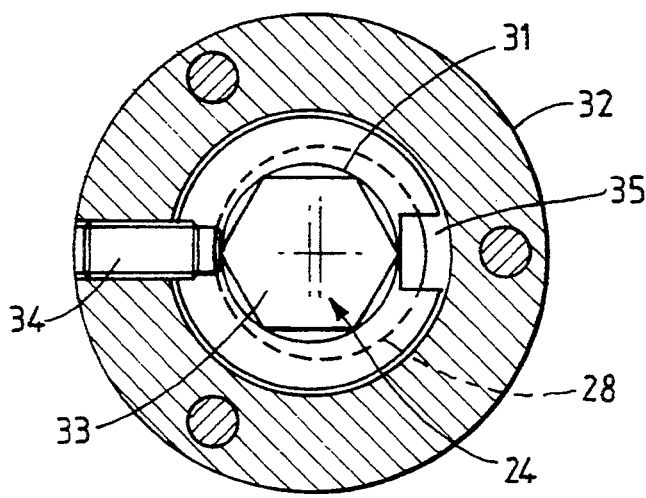
FIG. 5 is a section taken along line V—V of FIG. 4.
Figure 2:
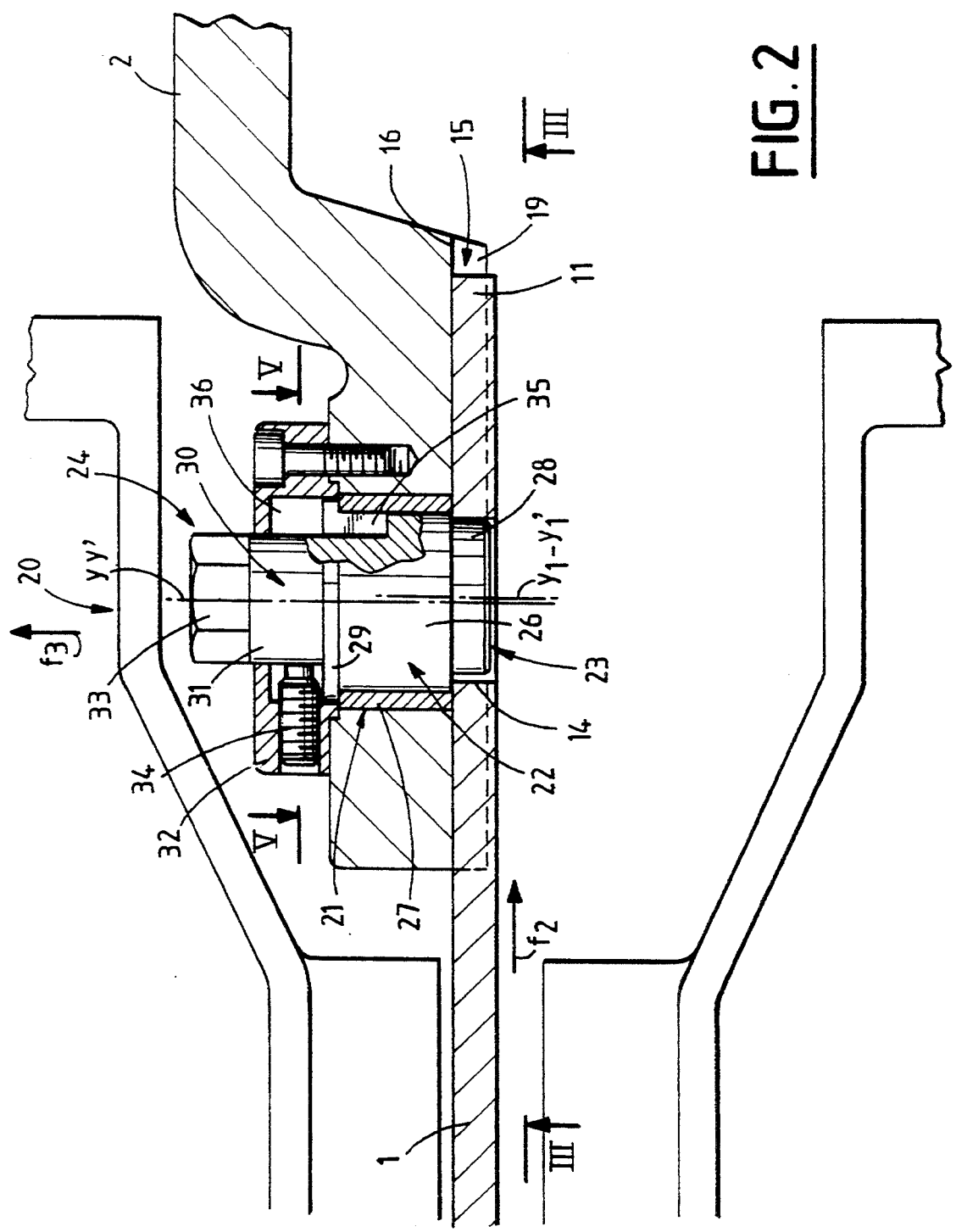
FIG. 2 is a partial section-elevation taken, on a larger scale, substantially along line II—II of FIG. 1.

According to a first embodiment illustrated in FIGS. 2 and 3, the device employs, on the tool 1 and opposite its active part 10, a tang 11 which presents the characteristic of being in the form of a tenon comprising, at least locally, two edges 12 which converge in direction opposite part 10, at an angle $\alpha$ which may be included between 18° and 22°. Angle $\alpha$ is preferably equal to 20°. According to another characteristic, the tang or tenon 11 is also made to present, as illustrated in FIG. 4, a cross section in dove-tail form giving to the convergent longitudinal edges 12 faces 13 which are each inclined in convergent manner at an angle $\beta$ included between 45° and 70°. Angle $\beta$ is preferably fixed at 60°. According to a third constructive characteristic of the tenon 11, an opening 14 is made in the substantially median part, being for example in circular form centred on the longitudinal axis x-x' of the tenon 11.

It must be considered that the angle $\alpha$ may be defined, as illustrated, by two edges 12 which are inclined by the same value with respect to axis x-x', or by edges 12 inclined by different values. It may even be envisaged that one of the edges be parallel to axis x-x'.

The device of the invention employs on the arm or support and actuation member 2 an open mortise 15 whose depth between the bottom 16 and the open top 17 is compatible with receiving the thickness of the tenon 11. Mortise 15 is exactly complementary of tenon 11 and consequently comprises two edges 16 which likewise converge at angle $\alpha$ and are defined by faces 19 taking, in cross-section, a dove-tail shape defined by angle $\beta$ for each of said edges.

In this way, it is possible, by engaging the tang 11 in the mortise 15, in the direction of arrow $f_2$, to obtain axial wedging and transverse wedging by the cooperation of faces 13 and 19 respectively defining edges 12 and 18.

Furthermore, the device of the invention employs, for assembling and dismantling the tang 11 in and from the mortise 15, a removable fixation system 20 adaptable in a housing 21 presented by member 2, so as to be able to be placed in at least partial register with the opening 14, when the tang or tenon 11 is in the state of engagement in the mortise. The removable fixation system 20 comprises a lock 22 mobile in housing 21 and presenting a locking head 23 adapted to cooperate with the opening 14. The lock, as a whole, is associated with means 24 performing functions of manual control in position of retraction of the head 23 with respect to the mortise 15 and of actuation in position of locking, in which the head 23 is engaged in the opening 14 to act on the edge of the latter, in order to urge the tenon 11 in the direction of arrow $f_2$ in relative displacement in the mortise 15.

In the embodiment of FIGS. 2 to 4, the system 20 is of the type rotating on axis y-y' which is perpendicular to the plane of the bottom 16 of the mortise 15. The rotating system comprises a cylindrical body 26 which is mounted to rotate in housing 21 either directly or with the interposition of a lining, ring or bush 27. The body 26 is extended at one end by head 23 which is constituted by a cylindrical bearing surface 28 of axis y-y' out of center with respect to axis y-y'. Opposite the out-of-center bearing surface 28, body 26 is extended, in particular beyond a shoulder or flange 29, by a block 30 constituting means 24 and comprising a cylindrical bearing surface 31 coaxial to body 26 and guided through a block 32 adaptable on the member 2 and more particularly on that face of the latter opposite the one presenting the mortise 15. The block 32 may be adapted in any appropriate manner by being centred coaxially to housing 21.

Block 30 is extended outside block 32 by a means 33 adapted to perform a function of driving body 26 in rotation. To that end, means 33 may advantageously be constituted by a polygonal extension, possibly completed by a head performing a function of manual control.

Block 32 bears a locking means 34 constituted by a screw extending above the shoulder 29 for which it constitutes an axial stop. Screw 34 is intended to cooperate with the bearing surface 31 to angularly immobilize the lock in a position in which the head 23 projects from the bottom of the mortise 15 and cooperates with opening 14. Body 26 comprises, in its peripheral part corresponding to the out-of-centre part of the bearing surface 28, a cut 35 whose width is slightly greater than the diameter of screw 34.

The device is employed in the following manner:

The tenon 11 having been suitably fitted in the mortise 15, the removable fixation system is controlled in rotation via the extension 33 to bring cut 35 into radial alignment with screw 34. In this way, it is possible to control withdrawal or retraction in the direction of arrow $f_3$ of body 26 and consequently of the locking head 23 with respect to the bottom 16 of the mortise 15 whose section of passage is thus entirely freed. The range of retraction or of axial withdrawal of the body 26 is determined by cooperation between the shoulder 29 and the top of the block 32 which, to that end, defines a recess 36.

Tenon 11 may then be engaged in the direction of arrow $f_2$ to bring about cooperation of faces 13 and 19 in a position in which the opening 14 is substantially placed in register with housing 21.

In this position, body 26 is displaced in the direction opposite arrow $f_3$, then subjected to rotation by extension 33 in order to cause the out-of-center part of the bearing surface 28 to act against the edge of the opening 14 and maintain engagement in the direction of arrow $f_2$ of tenon in mortise 15 in which the tenon is subjected to axial and transverse wedging with application against the bottom 16 by reason of the dove-tail cross-sections.

The wedging thus obtained in the two planes is made firmer by the rotation of body 26 up to refusal for example, after which the screw 34 is tightened against the bearing surface 31 to angularly immobilize the lock 22.

In this state, a firm, resistant and long-lasting connection is established between the member 2 and the tool 1 without risk of untimely disconnection.

When the tool 1 is to be disengaged, the system 20 is actuated in a procedure opposite the one which has just been described, by loosening the screw 34, thus making it possible to control reverse rotation of the body 26 in order to disengage and move the out-of-center bearing surface 28 away with respect to the edge of the opening 14. After having controlled retraction of lock 22 by acting from means 24, it then suffices to unwedge the tenon 11 and disengage it from the mortise in the direction opposite arrow $f_2$.

Figure 6:
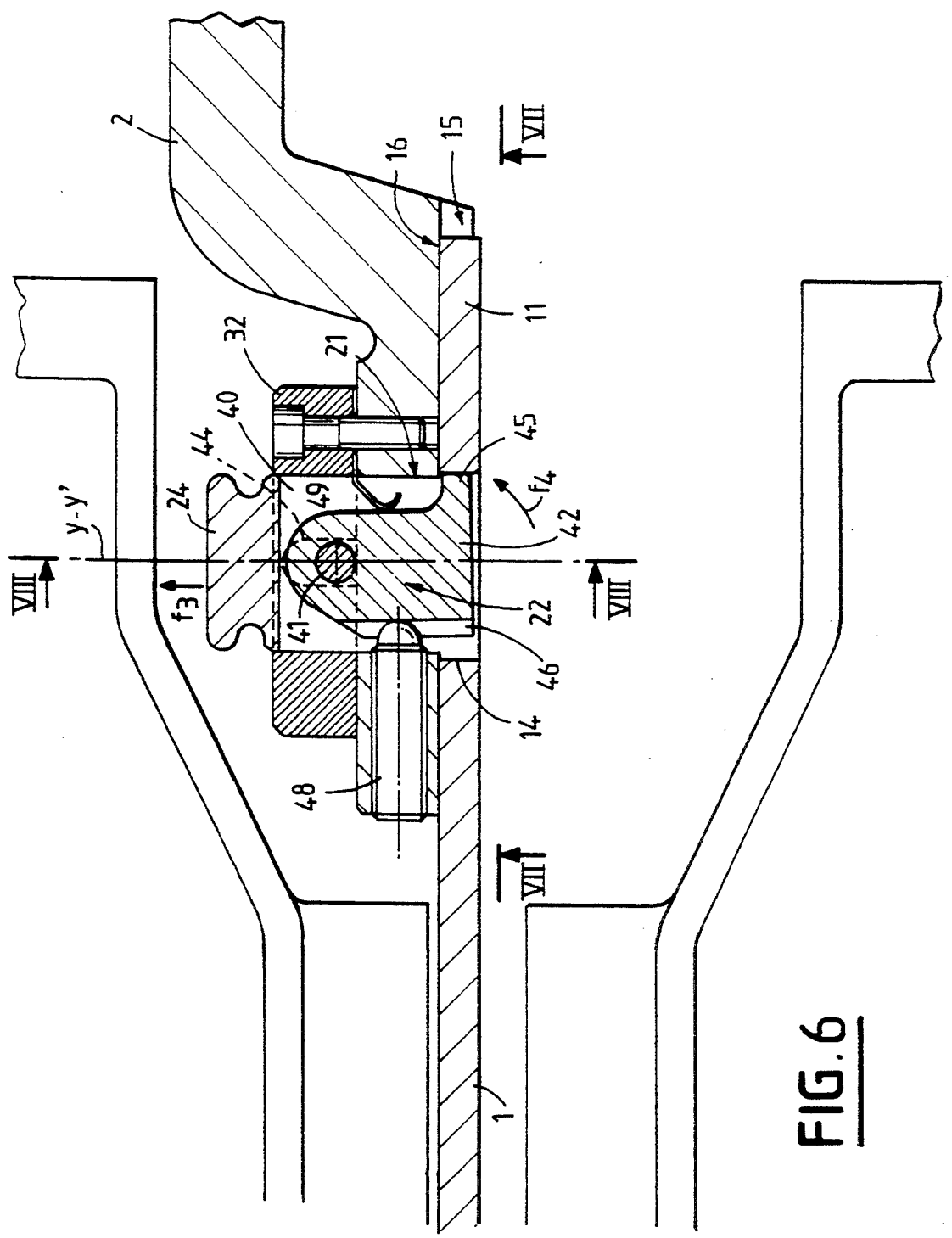
FIG. 6 is a partial section-elevation similar to FIG. 2, but illustrating a variant embodiment.
Figure 7:
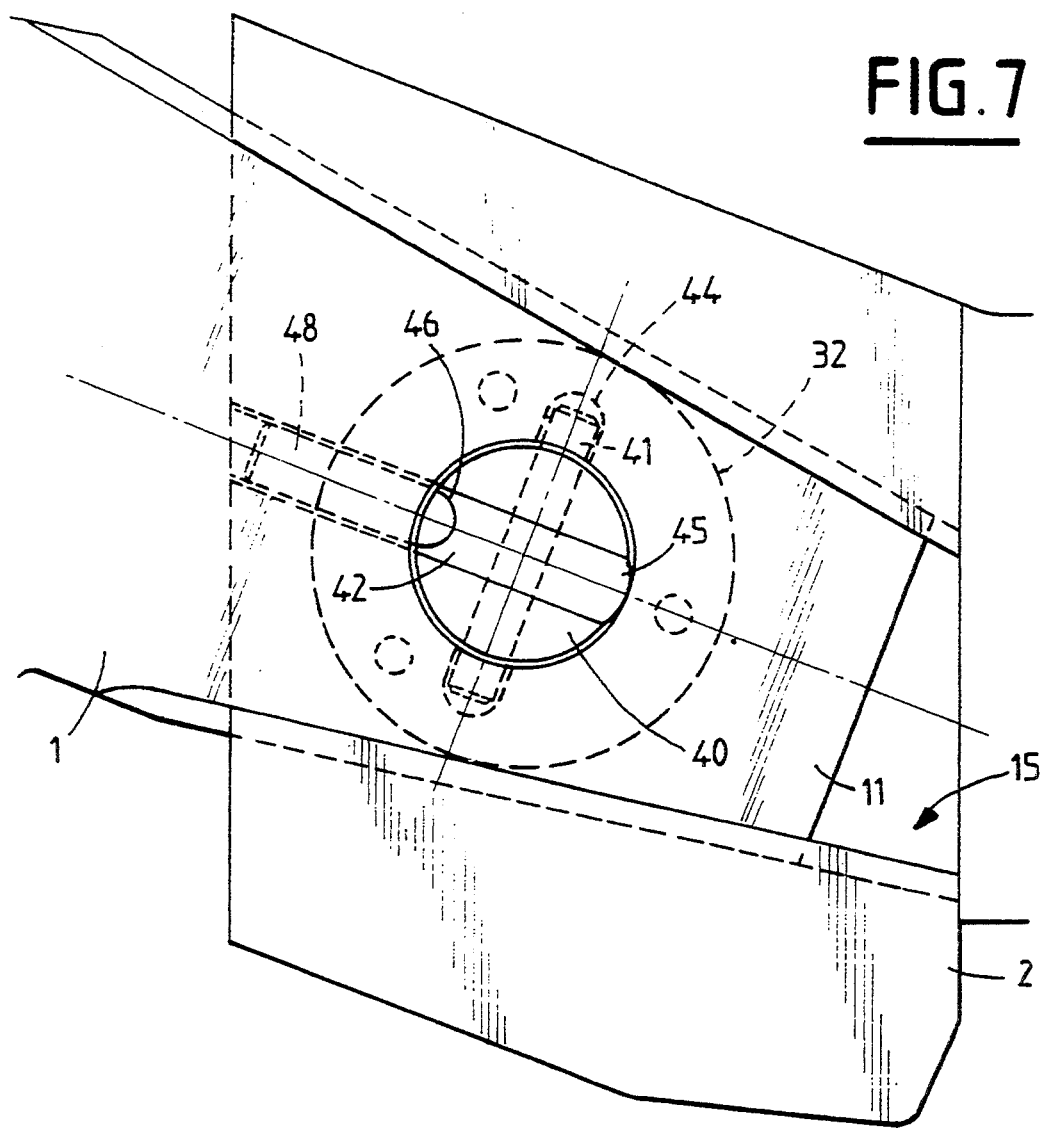
FIG. 7 is a plan view taken along line VII—VII of FIG. 6.
Figure 8:
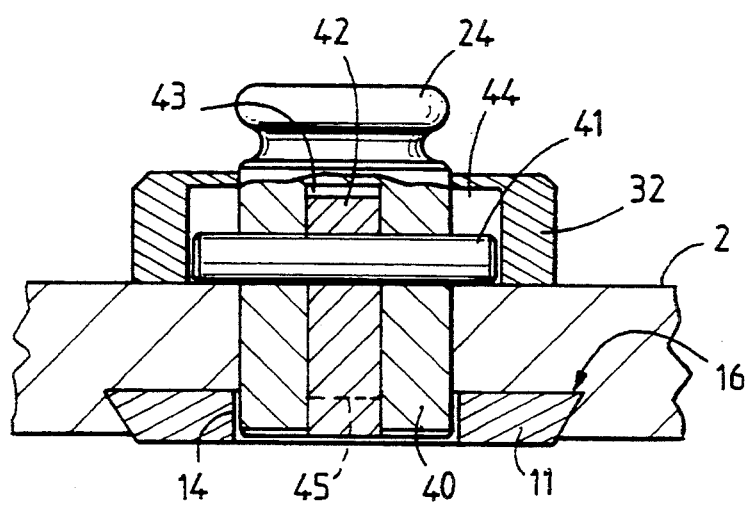
FIG. 8 is a transverse section taken along line VIII-—VIII of FIG. 6.

FIGS. 6 to 8 show a variant embodiment in which the block 32 supports a lock body 40 occupying the housing 21 in which it may slide along axis y-y'. Body 40 forms, outside the block 32, the means 24, such as a knob, constituting a member for manually controlling retraction in the direction of arrow $f_3$.

Body 40 supports, via a pin 41, a pivoting locking head 42 which is disposed to pivot freely inside a recess 43 made in body 40 to give it the form of a fork joint. Pin 41 is provided with terminal parts which extend inside oblong clearances 44 made in block 32, in a direction which is perpendicular to the plane of the bottom 16 of the mortise 15. Pin 41 extends substantially parallel to the plane of the bottom 16.

The locking head 42, intended to project inside the mortise 15 in the locking position, comprises a locking nose 45 intended to cooperate with the edge of the opening 14. The head 42 also comprises, opposite nose 45, a groove 46 adapted to receive a pusher incorporating screw 48 constituting an actuation means in locking position of head 42. Screw 48 is, to that end, mounted in member 2 which furthermore supports, for example in association with block 32, an elastic return member 49 acting on the head 42.

In the position illustrated in FIGS. 6 to 8, the tenon 11 is engaged in the mortise 15 and the body 40 is driven in block 32, so that the head 42 is engaged in opening 14.

By tightening the screw pusher 48, the head 42 is tipped or pivoted in the direction of arrow $f_4$, with the result that the locking nose 45 abuts against the edge of the opening 14 and reinforces the double wedging produced by the combined shapes of the tang 11 and of the mortise 15, as described previously.

When the tool 1 is to be released, the screw pusher 48 is loosened so as to cause the head 42 to tip back by the action of the elastic member 49.

It then becomes possible to act on the member or knob 24 in order partially to extract the head 42, with respect to the opening 14, in the direction of arrow $f_3$, by retracting this head inside the housing 21. The amplitude of axial slide of the body 40 is for example limited by the cooperation between the nose 45 and the spring 49 or, more precisely, by the height of the uniform clearances 44.

Tenon 11 may then be disengaged from mortise 15.

Figure 9:
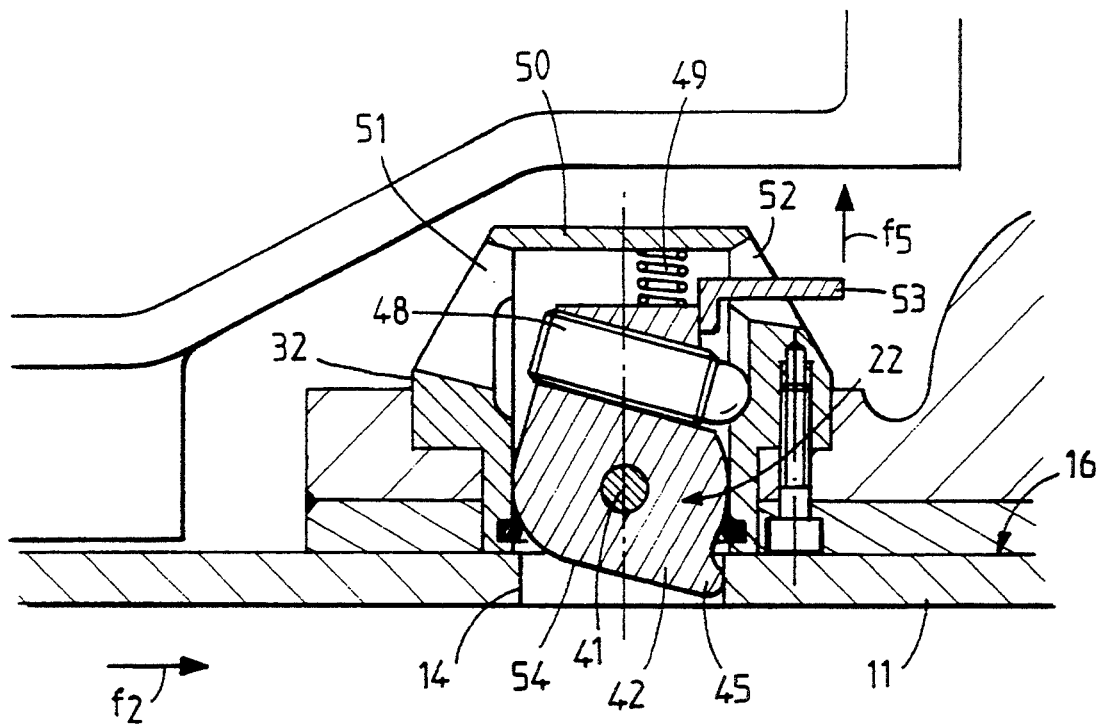
FIG. 9 and 10 are elevations, partly in partial section, illustrating two other variant embodiments.

FIG. 9 shows another variant embodiment in which the block 32 constitutes per se the body supporting the pivoting head 42 likewise provided with the locking nose 45. In this variant embodiment, the screw pusher 48 is borne by the pivoting head in order to cooperate with the block 32 directly. The elastic member 49 is then interposed between the pivoting head 42 and the top 50 of the block 32 which presents a first slot 51 for access to the screw 48 and a second slot 52 through which projects a means 53 fast with the head 42 and adapted to constitute a retraction-control member against the action of the spring 49.

The shape of the head 42 is chosen so that, as a result of manual action on the member 53, in the direction of arrow $f_5$, the locking nose 45 may be completely retracted by pivoting the head 42 with respect to the bottom 16 of the mortise 15, when engagement of the tenon 11 is to be facilitated. It may also be envisaged to give the head 45, in line with nose 45, an inclined ramp 54 enabling the nose 45 to be automatically retracted during engagement of the tenon 11 in the direction of arrow $f_2$.

Figure 10:
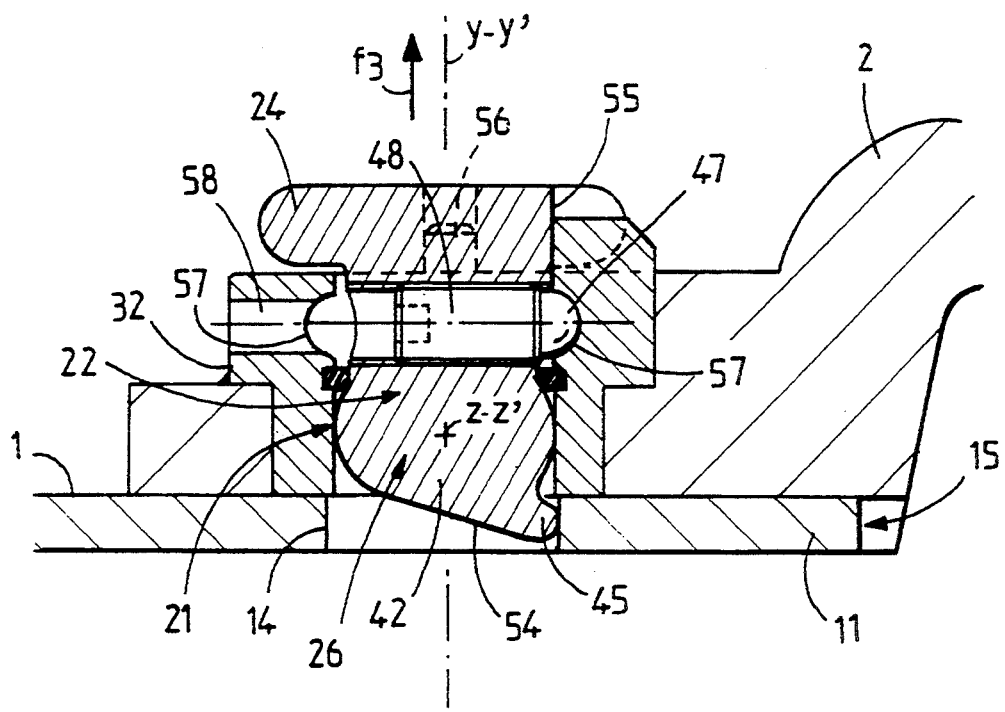

FIG. 10 shows another variant embodiment in which the lock body 26 constitutes per se the head 42 provided with the locking nose 45 and forms, outside the block 32, the means 24 such as a knob adapted to control retraction in the direction of arrow $f_3$ by axial slide along axis y-y' in housing 21, as stated hereinabove. In this embodiment, the body 26 is, for example, of partially barrelled shape in the part forming the head 42 so as to be able also to know a relative pivoting about a virtual axis-z-z'. Immobilization of body 26 in rotation may be ensured via a flat portion 55 or a pin or stud 56. In this embodiment, the screw pusher 48 is borne by the body 26 to cooperate with an annular groove 47 presented by the inner peripheral face of the body 32 which comprises a hole 58 for access to the pusher 48. The head 42 may also comprise the ramp 54, as in the preceding example.

Figure 11:
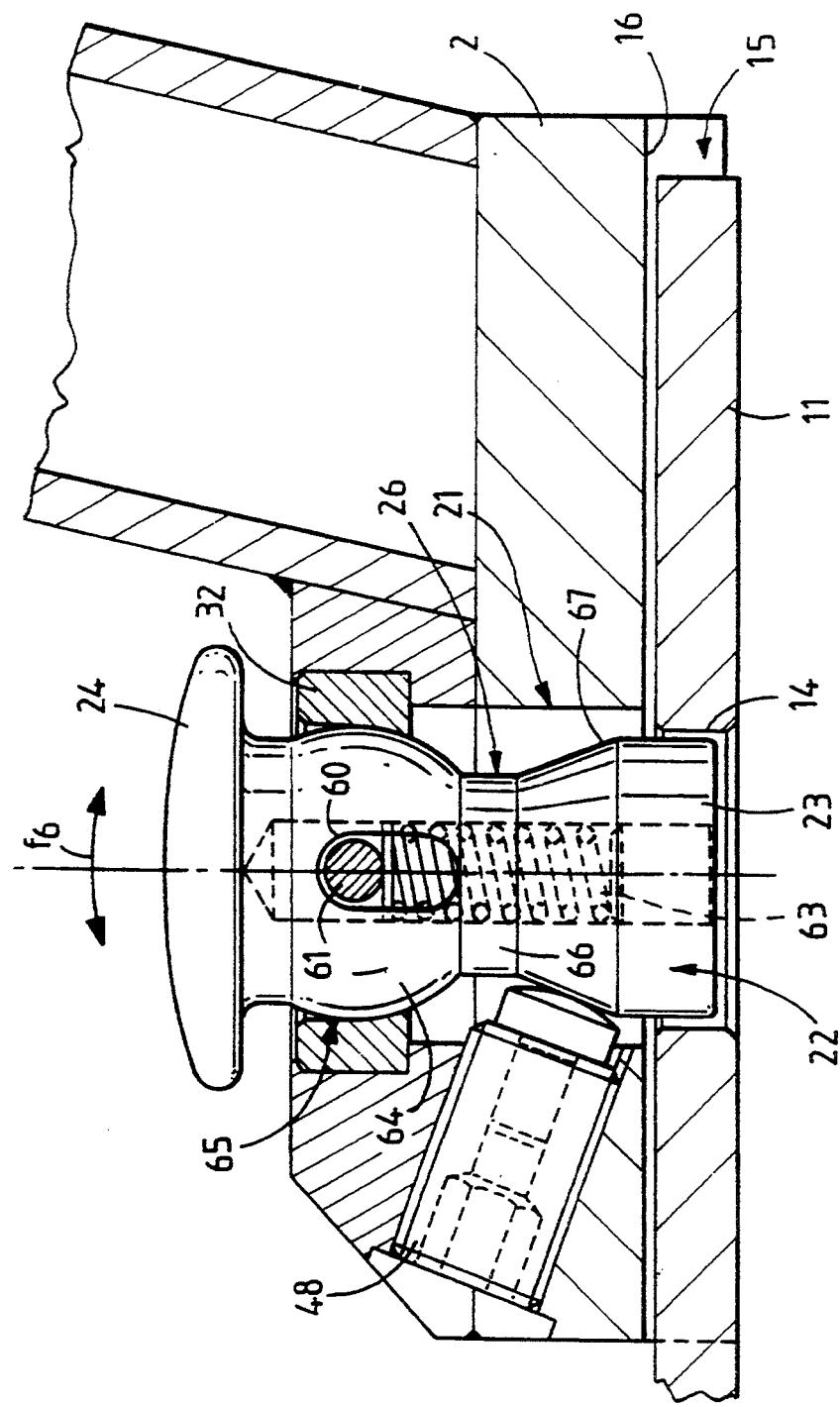
FIG. 11 is a section-elevation of another embodiment.

FIG. 11 shows a preferred embodiment in which the mobile lock 22 is of the type sliding along axis y-y' and comprises a locking head 23 and means 24. The lock 22 presents a body 26 substantially in the form of a diabolo of which one of the ends constitutes the head 23 and the other end comprises the means 24 located outside the block 32. The body 26 is mounted via a transverse slot 60 on a pin 61 borne by block 32. A spring 62 is mounted in a blind bore 63 of the body 26 to abut under pin 61 and always urge the head 23 to project in the mortise 15. The body 26 forms, under the means 24 and substantially in the plane of pin 61, a barrelled part 64 similar to a spherical bearing surface cooperating with a seat 65 presented by the block 32. Body 26 may thus pivot perpendicularly to axis 61 in the double direction of arrow $f_6$. The bearing surface 64 ends in a neck 66 which is joined to the head 23 by a truncated part 67 on which the screw pusher 48, whose function is identical to the one previously explained, acts.

The invention is not limited to the examples described and shown, as various modifications may be made thereto without departing from its scope. In particular, the angle α, defined between the longitudinal edges, may be directed in the opposite direction, i.e. towards the tool proper, on condition that an intermediate part of constant width, allowing mounting and dismantling with respect to mortise 15, is provided between the tenon 11 and the tool body.

What is claimed is:

1. Device for removable fixation between a support and actuation member and a tool, of the type employing, on the tool, a tang locally in the form of a tenon of dove-tail cross-section, on the member, a complementary mortise adapted to receive the tang by axial slide and, between the two, a removable fixation system, wherein:

the tang locally comprises, on the one hand, two longitudinal edges defining the tenon and converging at an angle and, on the other hand, an opening located between said edges, the support member comprises a mortise, defined by two longitudinal edges, complementary to those of the tenon and presents, between said edges, a through housing opening in the mortise in order to be substantially in register with the opening in the state of engagement of the tenon in the mortise, the removable fixation system comprises a block placed in relation with the housing and bearing a mobile lock disposed in said housing, provided with a locking head and associated with means for manual control in position of retraction of the head with respect to the mortise and for actuation in locking position, in which the head is engaged in the tenon opening and acts on the edge thereof to urge said tenon in relative displacement in the mortise, in the direction of convergence of the edges.

2. The device of claim 1, wherein the angle is included between 18° and 22°.

3. The device of claim 1 wherein the tenon presents a dove-tail cross-section comprising edges inclined by an angle of between 45° and 70°.

4. The device of claim 1, wherein the mortise of the support member is open.

5. The device of claim 1, wherein the lock of the removable fixation system rotates about an axis perpendicular to the plane of the bottom of the mortise, and the locking head of said lock is constituted by a bearing surface out-of-center with respect to the axis of the lock.

6. The device of claim 5, wherein the lock is constituted by a cylindrical body rotating in the housing, immobilized axially and extended at one end by the out-of-center bearing surface and, at the other, by a block performing the functions of manual control means and of actuation means.

7. The device of claim 6, wherein the block comprises, opposite the out-of-center bearing surface, on the one hand, a cylindrical bearing surface coaxial to the body, traversing the body to cooperate with a means for blocking in rotation and, on the other hand, in the axis of said bearing surface, an extension projecting out of the body and adapted to drive the body in rotation in the housing.

8. The device of claim 7, wherein the body of the lock presents, in its part joining the block, a shoulder located beneath the locking means which is constituted by a radial screw mounted in the block to perform a supplementary function of axial stop, and the cylindrical body presents, in its peripheral wall and in line with the out-of-center part of the bearing surface, an axial cut whose width corresponds to the diameter of the screw.

9. The device of claim 1, wherein the lock of the removable fixation system comprises a body bearing a head pivoting substantially on a pin parallel to the plane of the bottom of the mortise and a means for actuation of the head constituted by a screw pusher.

10. The device of claim 9, wherein the body is borne by a pin with the presence of oblong slots or clearances giving a limited freedom of axial displacement in retraction of the head with respect to the opening in a direction perpendicular to the plane of the bottom of the mortise, and said head comprises a locking part adapted to cooperate with the edge of the opening under the action of the screw pusher.

11. The device of claim 9, wherein the body is integral with the block and contains the pivoting head which forms, on the one hand, the locking part and, on the other hand, a manual control means traversing the block.

12. The device of claim 9, wherein the body per se forms the locking head.

13. The device of claim 9, wherein the screw pusher is interposed between the block or the support member and the pivoting head.

14. The device of claim 9, wherein the manual control means is constituted by a knob formed by the body outside the block.

15. The device of claim 9, wherein an elastic return member, in position of retraction of the head, is interposed between the latter and the body or block.

16. The device of claim 2, wherein the tenon presents a dove-tail cross-section comprising edges inclined by an angle of between 45 and 70°.

* * * * *